United States Patent [19]

Sasaki

[11] Patent Number: 5,675,563
[45] Date of Patent: Oct. 7, 1997

[54] TRACK ACCESS METHOD AND APPARATUS THEREFOR

[75] Inventor: Takeshi Sasaki, Tokyo, Japan

[73] Assignee: NEC Corporation, Japan

[21] Appl. No.: 651,840

[22] Filed: May 21, 1996

[30] Foreign Application Priority Data

May 23, 1995 [JP] Japan .................................. 7-123517

[51] Int. Cl.$^6$ ...................................................... G11B 7/00
[52] U.S. Cl. ............................................ 369/44.28; 369/32
[58] Field of Search ............................ 369/32, 47, 48, 369/50, 54, 58, 44.27, 44.28, 44.29, 44.31, 44.32, 44.33, 44.34, 44.35, 44.36

[56] References Cited

U.S. PATENT DOCUMENTS

| | | | |
|---|---|---|---|
| 4,615,023 | 9/1986 | Inada et al. | 369/44.28 X |
| 4,764,911 | 8/1988 | Morota et al. | 369/32 |
| 5,117,410 | 5/1992 | Akiyama | 369/54 X |
| 5,177,718 | 1/1993 | Takeuchi | 369/44.28 X |
| 5,317,550 | 5/1994 | Semba | 369/32 |
| 5,442,604 | 8/1995 | Osada | 369/44.32 X |

FOREIGN PATENT DOCUMENTS 61-177641  8/1986  Japan .

*Primary Examiner*—P. W. Huber
*Attorney, Agent, or Firm*—Hayes, Soloway, Hennessey, Grossman & Hage, P.C.

[57] ABSTRACT

A method of track access is provided which, when there is a large offset in the neutral position of a focusing lens, achieves stable tracking servo operation and prevents a slowing down of access time. In this method, when performing an operation which accesses a target track, a focusing lens resilient part external force compensation value, which is the average value of lens actuator drive command values when the lens lock servo is in the on condition, is added to a lens actuator drive command value which is calculated by a digital signal processor (8), this value being the output value with respect to the D/A converter B10, so that even if there is inclination in the optical recording/reproducing apparatus, or deformation or the like in the resilient part that holds the focusing lens, thereby causing a large offset in the neutral position of the focusing lens, it is possible to cancel out external disturbance to control by the external force of resilient part which holds the focusing lens, thereby achieving stable access performance and enabling a shortening in the access time.

8 Claims, 4 Drawing Sheets

TRACK ACCESS METHOD AND APPARATUS THEREFOR

BACKGROUND OF THE INVENTION

1. Field of the Invention

The present invention relates to a method and an apparatus for track access, and more specifically it relates to a track access method and apparatus used in an optical recording and reproducing apparatus.

2. Description of the Related Art

In general, in an optical recording/reproducing apparatus, a high-speed access method is used, in which a two-stage actuator having a coarse motor means which drives an optical head and a lens actuator means provided inside the optical head and which drives a focusing lens in the radial direction with respect to the rotating recording medium, such as disclosed, for example, in Japanese Unexamined Patent Publication No. 61-177641.

In this track access method, when the light spot is moved to the target track, the lens position error from the neutral position of the focusing lens in the radial direction of the medium is detected, and control is performed to make the lens position error zero, by performing position control of the optical head using the coarse motor means while performing speed control of the focusing lens with the lens actuator means in the radial direction of the medium in accordance with a pre-set reference speed corresponding to the distance to the target track, until the light spot is moved to the target track.

However, in the above-described track access method of the past, because of a deformation or vibration of a resilient part which includes, for example, a leaf spring that holds the focusing lens to the optical head or because of a large inclination of the optical recording/reproducing apparatus when it is installed, if there is a large amount of skew in the neutral position of the focusing lens, which is the position of the focusing lens with respect to the optical head when no drive is being performed, when performing positioning of the focusing lens and tracking control, for example, when accessing a target track, the an external force of the leaf spring of the focusing lens acts constantly, thereby causing an error in the speed control calculation, which results in unstable pull-in action in the tracking servo operation, thereby causing the problem of a lengthened access time.

Additionally, when making a track jump, which is a precision access in which the focusing lens is moved to the immediately adjacent track, if the external force of the above-noted resilient part such as a leaf spring is large, the dispersion in the pull-in position of the tracking servo operation becomes large, leading to the problem of an unstable pull-in operation of the lens in the tracking servo operation.

SUMMARY OF THE INVENTION

In consideration of the above-noted drawbacks in the prior art, an object of the present invention is to provide a method for track access and an apparatus therefor, whereby, even in the case in which the focusing lens is sewed greatly from a prescribed position with respect to the optical head, because of, for example, deformation when using a resilient part which includes a leaf spring or the like that movably holds the above-noted focusing lens to the above-noted optical head, vibration in the above-noted resilient part which occurs when driving the drive system, or a large inclination in the above-noted resilient part occurring when it is installed into the optical recording/reproducing apparatus, the repelling force of the above-noted resilient part that holds the focusing lens is canceled out, so that the tracking servo can operate not only to achieve stable access performance, but also to enable a shortening of the access time.

To achieve the above-noted object, the present invention uses the basic technical constitution described below.

Specifically, the first aspect of the present invention is a track access method for a track access apparatus configured by an optical head; an optical head drive motor means which drives the optical head; a focusing lens which is held via a resilient part to the main part of the optical head; a lens actuator means which causes the above-noted focusing lens to be driven in the radial direction with respect to the direction of rotation of the recording medium; a lens position error detecting means which optically detects the position error of the focusing lens with respect to the optical head in the recording medium radial direction; and a control means which controls each of the above-noted means.

And the present invention is further characterized in that, in the case of moving the focusing lens to a target track, when performing position control of the optical head drive motor means in order to make the position error of the focusing lens zero, while performing control of the lens actuator means so that the speed of the focusing lens in the radial direction of the recording medium, is in accordance with a pre-set reference speed corresponding the distance to the target track, a position control of the focusing lens so as to minimize the focusing lens position error with respect to the optical head in the recording medium radial direction, is executed beforehand by driving the lens actuator means, and simultaneously with this, a compensation data obtained from the drive current value of the lens actuator means at that time is stored as a resilient part external force compensation value and the compensation value is added to the drive command value of the lens actuator means when moving the focusing lens in accordance with the above-noted reference speed.

The second aspect of the present invention is a track access apparatus which is configured by an optical head; an optical head drive motor means which drives the optical head; a focusing lens which is held via a resilient part to the main part of the optical head; a lens actuator means which causes the above-noted focusing lens to be driven in the radial direction with respect to the direction of rotation of the recording medium; a lens position error detecting means which optically detects the position error of the focusing lens with respect to the optical head in the recording medium radial direction; and a control means which controls each of the above-noted means.

And the apparatus is further characterized in that, at least in the case of moving the focusing lens to a target track, a control is performed of the above-noted lens actuator means so that the speed of the focusing lens in the recording medium radial direction is in accordance with a pre-set reference speed corresponding the distance to the target track, while performing position control of the optical head drive motor so that the position error of the focusing lens is zero, this track access apparatus further having storage means which, when position control of the focusing lens is performed so as to minimize the focusing lens position error with respect to the optical head in the recording medium radial direction beforehand by driving the lens actuator means, stores compensation data obtained from the drive current value of the lens actuator means at that time as a spring external force compensation value, and an adding means which adds the above-noted spring external force compensation value to the drive command value of the lens actuator means when moving the focusing lens in accordance with the above-noted reference speed.

That is, the basic technical concept common to a track access method according to the present invention and a track access apparatus according to the present invention, is that of a configuration having an optical head drive motor means which functions as a coarse motor for the purpose of performing coarse access drive of the optical head, a focusing lens which is held to the main part of the optical head via a resilient part, lens actuator means for the purpose of fine access by causing the above-noted focusing lens to be driven in the radial direction of the recording medium, a lens position error detecting means which optically detects the position error of the focusing lens with respect to the optical head in the recording medium radial direction, storage means when position control of the focusing lens is performed so as to minimize the focusing lens position error with respect to the optical head in the recording medium radial direction beforehand by driving the lens actuator means, namely, a lens-lock survo mechanism is in ON condition, stores compensation data obtained from the drive current value of the lens actuator means at that time or, more preferably, the average value of the lens actuator means at that time as a spring external force compensation value, and adding means which adds the above-noted spring external force compensation value to the drive value of the lens actuator means.

In accordance with the present invention, when causing the focusing lens to access a target track, when the lens actuator means is controlled so that the speed of the focusing lens in the radial direction of the recording medium is in accordance with a pre-set reference speed corresponding to the distance to the target track, while performing position control of the above-noted coarse drive motor so as to make the position error zero, the above-noted spring external force compensation value is added to the drive command value of the lens actuator means.

In addition, it is also possible to apply the present invention, having the above-described technical configuration, to the task of performing precision access by making the focusing lens to an immediately adjacent target track, that is, to the operation of what is known as track jumping.

By virtue of the above-described technical constitution, a track access method or a track access apparatus according to the present invention performs position control of the focusing lens so as to minimize the position skew of the focusing lens with respect to the optical head in the radial direction of the recording medium, thereby holding the focusing lens magnetically fixed with respect to the optical head, operates a lens-lock servomechanism, and further stores the lens actuator means average drive current at that time as the resilient part external force compensation value.

When performing coarse access or fine access to a target track, the resilient part external force compensation value is added to the lens actuator means drive value. By doing this, even if there is a large skew in the neutral position of the focusing lens by reason of deformation of the resilient part which holds the focusing lens to the optical head or by reason of a large inclination of the above-noted resilient part occurring at the time of installation of the optical recording/reproducing apparatus, the repelling force of the above-noted resilient part is canceled out, thereby pull-in operation by the tracking servo mechanism and providing stable operation, while preventing a loss of access speed.

DETAILED DESCRIPTION OF THE INVENTION

A specific example of a track access apparatus according to the present invention will be described below, with reference made to the appropriate accompanying drawings.

Figure 1:
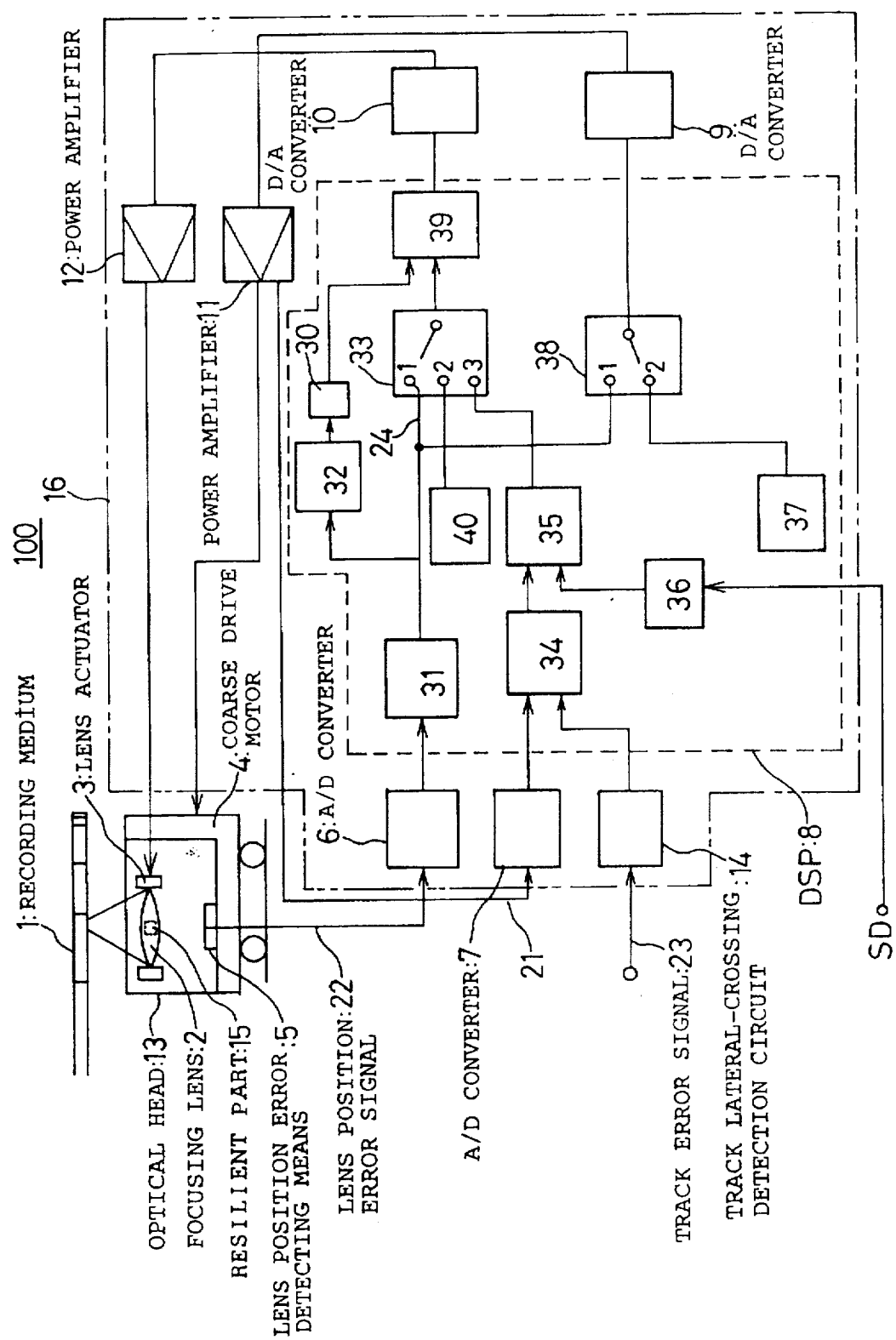
FIG. 1 is a block diagram which shows the configuration of the first example of a track access apparatus according to the present invention.

FIG. 1 is a block diagram which shows an example of a track access apparatus 100 according to the present invention, in which the track access apparatus 100 is configured by an optical head 13 which is provided in proximity to a recording medium 1, an optical head drive means 4 having a coarse motor which drives the optical head 13, a focusing lens 2 which is held to the main body of the optical head 13 via a resilient part 15 which is, for example, formed by a leaf spring or the like, a lens actuator means 3 for precision access which causes drive of the focusing lens 2 in the radial direction with respect to the direction of rotation of the recording medium 1, a lens position error detecting means 5 which optically detects the position error of the focusing lens 2 with respect to the optical head 13 in the radial direction of the recording medium 1, and a control means 16 which controls the various above-noted means.

And in the present invention, minimally when the focusing lens 2 is moved to a target track, the above-noted control means 16 performs position control of the above-noted optical head drive motor 4 so as to make the position error of the focusing lens 2 zero, while performing control of the lens actuator means 3 so that the speed of the focusing lens 2 in the recording medium radial direction is in accordance with a pre-set reference speed which corresponds to the distance to the target track, the track access apparatus 100 further having a storage means 32 which, when position control is performed of the focusing lens 2 so as to minimize the position error of the focusing lens 2 with respect to the optical head 13 in the radial direction of the recording medium 1 beforehand, by driving the lens actuator means 3, stores as the compensation data obtained from the drive current value of the lens actuator means 3 at that time as the resilient part external force compensation value, and an adding means 39 which adds the above-noted stored resilient part external force compensation value to the lens actuator means drive command value when moving the focusing lens in accordance with the above-noted reference speed.

In the present invention, a technical conception in which the control to make the position error of the focusing lens 2 zero, means that the optical head driving means 4 is also driven so that the movement of the optical head can trace the movement of the focusing lens 2.

Describing the control means 16 of the present invention in further detail, in addition to being provided with a power amplifier 12 for the purpose of driving the lens actuator means 3 and a power amplifier 11 for the purpose of driving the optical head drive motor 4, it is provided with an A/D converter 6 to which is input a position error signal 22 that is output from the lens position error detection means 5, an A/D converter 7 to which is input the output 21 of the above-noted power amplifier 11, which corresponds to speed signal of the optical head 13, and a track lateral-crossing detection means 14 to which is input a track error signal 23 that is generated every time when the focusing lens crosses one of a plurality of grooves formed in the recording medium, the outputs of the above-noted A/D converters 6 and 7 and the track lateral-crossing detection means 14 being input to a DSP (digital signal processor) 8, to be described later.

The DSP 8 of the present invention has a phase compensator 31, to which is input the output of the A/D converter 6 and which is connected to a first switching means 33 and an averaging means 32, and a speed calculating means 34 of the optical head 13, to which is inputs the output from the above-noted A/D converter 7 and from the track lateral-crossing detection means 14 and an output of which is connected to a speed error calculating means 35, this speed error calculating means 35 having connected to it a reference speed storage table 36, into which is stored a plurality of reference values for movement speeds of the focusing lens 2 which are pre-established in accordance with the distance between the current position and the target track, the output of which is connected to the above-noted first switching means 33.

In addition, the first switching means 33 has connected to it a jump pulse generating means 40, which generates a jump pulse which is required when performing precision access of the focusing lens 2.

The first switching means 33 is provided with a switch, and is capable of appropriately selecting one input signal from the above-noted three types of input signals.

The output of the above-noted phase compensator 31 is connected to the input of a second switching means 38, the other input of this second switching means 38 being connected to the output of the optical head movement output generating means 37, for the purpose of moving the optical head 13 in the direction of the inner circumference of the recording medium at the point at which the lens lock servomechanism, to be described later, goes into the on condition, and in addition this second switching means 38 is provided with a switch, and is capable of appropriately selecting one input signal from the above-noted two types of input signals.

The output of the second switching means 38 causes, via the D/A converter 9, the power amplifier 11 to operate, this causing the optical head driving means 4 to be moved under control, and the output of the first switching means 33 is appropriately input, along with the output of the above-noted averaging means 32 to the adding means 39, the output of this adding means 39 causing, via the D/A converter 10, controlled drive of the lens actuator means 3.

In the present invention, the focusing lens 2 has an appropriate resilient part 15, formed by a leaf spring or the like, mounted to part of it so that it is held in cantilever manner to the optical head 13 by this resilient part 15.

Therefore, the focusing lens 2 can move flexibly up and down and in a horizontal direction with respect to the optical head 13, and can be moved up and down by a focal distance adjusting means (not shown in the drawing). There is no particular restriction placed on this focal distance adjusting means of the focusing lens 2, and a method such as disclosed in the U.S. Pat. No. 4,023,033 can be used.

The focal distance adjusting method of the focusing lens 2 is not part of the subject matter of the present invention.

The focusing lens 2 is configured so as to be movable by the lens actuator means 3 in the radial direction of the recording medium 1, that is, in the direction which is perpendicular to a track on the recording medium 1.

The lens actuator means 3 is preferably configured with its main part being, for example, an electromagnetic coil disposed at the side of the focusing lens 2.

Because the focusing lens 2 in the present invention, as noted above, is held in the optical head 13 by means of the resilient part 15, the range over which movement can be caused by the lens actuator means 3 is relatively small, being for example, approximately 0.5 millimeter.

The optical head 13, which holds the focusing lens 2 and is configured so as to be movable in the radial direction of the recording medium 1, is caused to move by the optical head drive motor means 4, the range of movement thereof being, for example, 30 millimeters.

Therefore, the lens actuator means 3 is used when performing precision access, and the optical head drive motor means 4 is known as the coarse drive motor, and is used when performing coarse-movement access.

The optical head drive motor means 4, similar to the lens actuator means 3, is preferably configured with its main part being, for example, a drive part which is an electromagnetic coil.

The lens position error detecting means 5 which is used in a track access apparatus 100, according to the present invention, has a function which optically detects the position error of the focusing lens 2 with respect to the optical head 13, in the radial direction of the recording medium 1, and, more specifically, when the focusing lens 2 is in the non-driven condition (neutral position), the lens position error detecting means 5 detects the degree to which the focusing lens 2 is skewed from a prescribed position of the optical head 13 in the radial direction of the recording medium 1, so that it is ultimately detecting whether or not the laser beam passes through the center of the focusing lens 2.

There is no particular restriction placed on this detection means, and a method such as disclosed in U.S. Pat. No. 4,989,193 can be used.

The operation of the track access apparatus 100, according to the present invention, will be described in detail below.

As is clear from the disclosure made in the above-noted Japanese Unexamined Patent Publication No. 61-177641, in a general optical recording/reproducing apparatus, there are two modes of accessing a target track, one being coarse access, and the other being precision access.

When executing coarse access, stroke data SD corresponding to the distance to the target track is input from an upstream control circuit (not shown in the drawing) to the reference speed storage table 36, which is provided in the DSP 8, which includes the above-noted control circuit 16.

The reference speed storage table 36 consists of a plurality of reference speed tables, into which reference movement speed data for the focusing lens 2, each corresponding to various distances remaining between the current position of the focusing lens 2 and the target track, respectively, are stored previously, the reference movement speed to be used in moving the focusing lens 2 corresponding to the input stroke data SD being selected from these tables.

The reference speed of the focusing lens 2 used in the present invention is such that it decreases as the stroke decreases.

In this case, because the first switching means 33 provided in the DSP 8 is first connected to the third input and the second switching means 38 is set so as to be connected to the first input, the reference speed data which is selected from the reference speed table 36 is converted to the prescribed analog signal by the D/A converter 10, a prescribed drive current being supplied to the lens actuator means 3 from the power amplifier 12, so that the focusing lens 2 starts moving in the direction of the target track at the specified reference speed.

Then, the lens position error detecting means 5 detects the skew (that is, the position error) between the focusing lens 2 and the optical head 13, and outputs a lens position error signal 22 which is responsive thereto, this lens position error signal 22 being input to the D/A conversion means 9 via the A/D converter 6 and the second switching means 38, thereby being converted to a prescribed analog signal responsive thereto, so that a prescribed drive current is supplied to the optical head drive motor 4 from the power amplifier 11, the result being that the optical head 13 starts to move in the direction of the target track, so as to track to the movement of the focusing lens 2.

When the focusing lens 2 passes by the plurality of grooves formed in the recording medium 1, the track lateral-crossing detection means 14 provided in the control means 16 has input to it the generated track error signal 23, which acts as a signal to indicate to what degree there is skew between each one of the center of the grooves and the center of the laser beam, and further the information as to how many number of tracks the focusing lens 2 has passed, output to the speed calculating means 34, based on this track error signal 23.

The speed calculating means 34 has input to it, from the above-noted power amplifier 11 via the A/D converter 7, the drive current value 21 of the optical head drive motor means 4, the actual movement speed of the focusing lens 2 being predicted and output to the speed error calculating means 35.

At the speed calculating means 34, a calculation is basically performed based on information with regard to how many tracks have been traversed during prescribed period of time, and a prediction is made of the actual speed of movement of the focusing lens 2 being made, and because the sampling period is lengthened in the case of a slowed speed of movement of the optical head 13, there is a delay in the timing of the output of the actual speed, the output from the power amplifier 11 being used to perform compensation for this delay.

In the speed error calculating means 35, a comparison calculation is performed between the reference movement speed of the focusing lens 2, which is selected from the reference speed table 36, and the actual speed of movement of the focusing lens 2, which is input from the speed calculating means 34, the difference between the speed of movement of the focusing lens 2 and the selected reference movement speed, that is, the speed error data for the focusing lens 2 being output, this being input, via the first switching means 33, to the adding means 39.

At adding means 39, because of the input of the output of the averaging means 32, which will be further described later, the sum of the two data are output to the D/A conversion means 10, thereby converting this summed value to a prescribed analog signal, which drives the lens actuator means 3 via the power amplifier 12 so that, as described above, the speed of movement of the optical head 13 also tracks to the speed of movement of the focusing lens 2, control being performed in accordance with the above-noted reference speed.

That is, as described above, during execution of speed control, at the DSP 8 the lens position error signal 22, which is the position error of the focusing lens 2 with respect to the optical head 13 is captured by the A/D conversion means 6, phase compensated by the phase compensating means 31, with the above-described tracking control being executed by the loop formed by the above-noted D/A conversion means 9, the power amplifier 11, and the optical head drive motor means 4.

In the present invention, when performing track jumping, which is precision access, the above-noted DSP 8 switches the first switching means 33 to the contact 2 thereof, which is connected to the jump pulse generating means 40, which generates a jump pulse consisting of the acceleration value and deceleration value required to move the focusing lens 2 in the prescribed manner, the second switching means 38 being left as is, this jump pulse being switched at a prescribed time so as to be output to the D/A conversion means 10, thereby driving the lens actuator means 3 via the power amplifier 12, thus causing the focusing lens 2 to move to an adjacent track.

Next, the method of calculating resilient part external force compensation value for the resilient part 15 which supports the focusing lens 2 will be described, with reference being made to FIG. 2.

Figure 2:
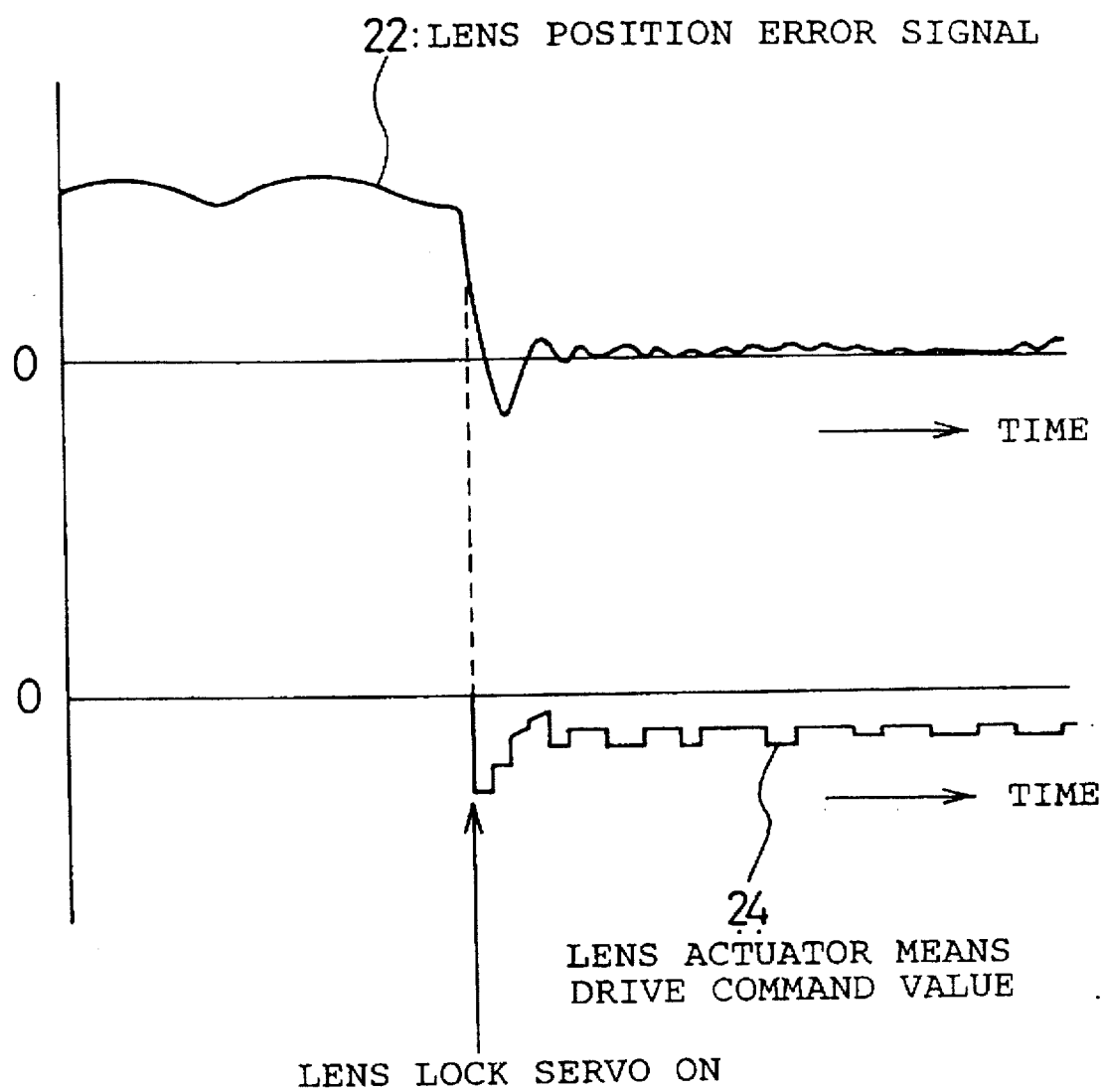
FIG. 2 is a drawing which illustrates the method of compensation of the external force of the resilient part which holds the focusing lens to the optical head in the present invention.

In FIG. 2, the condition being shown is that in which there is a large skew in the neutral position of the focusing lens 2, by reason of deformation or vibration of the resilient part 15, which is a leaf spring or the like, that supports the focusing lens 2, or by reason of a large inclination of the optical disk apparatus which occurs at the time of installation of the optical disk apparatus, the lens position error signal 22 in this condition exhibiting an offset with respect to the center position O.

Next, in the condition in which position control of focusing lens 2 is being performed in the direction that causes reduction of position offset thereof with respect to the optical head 13 in the radial direction of the recording medium 1 (hereinafter referred to as the lens lock servo mechanism being in on condition), the lens actuator means drive command value 24 required to reduced the lens position error signal 22 is output from the DSP 8, the result being that the position of the focusing lens 2 is established as that position at which the lens position error signal 22 is close to zero.

That is, an appropriate compensation value, which is obtained from the lens actuator means drive command value 24 in the lens lock servo mechanism being in on condition, can be considered to be the output value which has the generated power required to cause a return of the focusing lens 2 to the neutral position.

In this case, there is no particularly restriction on the appropriate compensation value, which is obtained from the lens actuator means drive command value 24 in the lens lock servo on condition, and it is possible to use, for example, the average value of the lens actuator means drive command value 24.

While the method of performing the calculation of the average value is not specified in the present invention, it is possible use such known averaging methods, for example, as the simple average method or the weighted average method, and it is additionally position to adopt the method of adding the lens actuator means drive command value 24 and storing this in memory within the DSP 8, each time period, the results of this addition being divided by the number of additions at the point at which the focus servo mechanism is switched on.

In the present invention, when the lens lock servo mechanism is in the on condition, the DSP 8 performs position control for the focusing lens 2 so that, with the first switching means 33 connected to the first input, and the lens position error signal 22, which is the position error of the focusing lens 2 with respect to the optical head 13, connected via the A/D conversion means 6, phase compensation thereof is performed by the phase compensation means 31, the result being output the D/A conversion means 10, thereby controlling the position of the focusing lens 2 by driving the power amplifier 12 and lens actuator mean 3 so that the lens position error becomes zero.

In the present invention, when the lens lock servo mechanism is in the on condition, the DSP 8 causes the second switching means 38 to be connected to the second input, the output of the optical head movement output generating means 37 being thereby output to the D/A conversion means 9, this output driving, via the power amplifier 11, the optical head drive motor means 4, causing the optical head 13 to move in the direction of the inner circumstance of the recording medium 1.

In the present invention, when the lens lock servo mechanism is in the on condition, the lens actuator means drive command value 24 is averaged by the averaging means 32 every pre-established period of time, for example, every 20 μs, the required compensation value being calculated, this averaged compensation value, that is, the averaged value, being stored in an appropriate storage means 30 which is connected to the averaging means 32.

As a result, as noted above, in the DSP 8 in the cases of both coarse access or precision access, with the lens lock servo mechanism in the on condition, the resilient part external force compensation value, which is the average value of the lens actuator means drive command value 24, is output from the storage means 30, added to the lens actuator drive command value 24 and then output to the D/A conversion means 10.

In addition, in the present invention when a series of access operations as described above occurs, the resilient part external force compensation value with respect to the focusing lens 2, which is calculated beforehand by the averaging means 32, is added to the above-noted lens actuator drive command value 24, which is calculated by the DSP 8, that is, an output to the above-noted D/A conversion means 10, so as to adjust the resilient part external force compensation value, the output thereof being updated and output from the D/A conversion means 10.

Next, the servo processing flow of the track access apparatus used in an optical disk apparatus according to the present invention will be described, with reference being made to the flowchart presented in FIG. 3.

Figure 3:
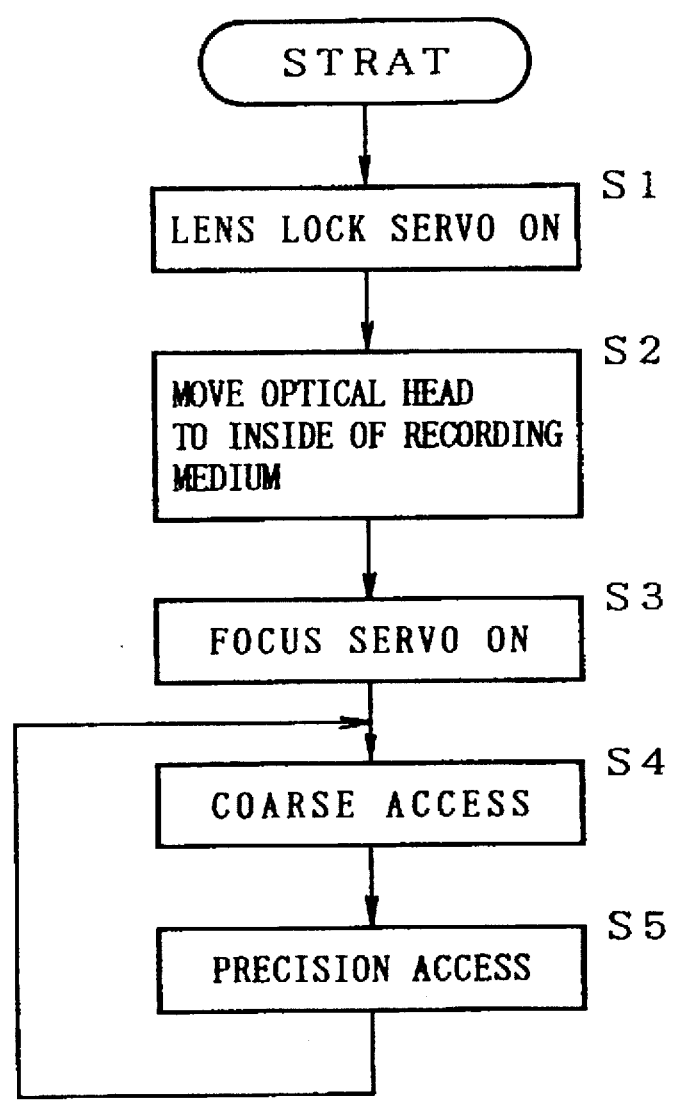
FIG. 3 is a flowchart which shows an example of the processing procedure in the case of executing the track access method according to the present invention.

In FIG. 3, START indicates the condition in which the power supply of the above-noted apparatus is switched on.

First, at step S1, the lens lock servo mechanism is set to on and, in step S2, after causing the optical head 13 to move toward the innermost circumference of the recording medium 1, at step S3 the focus servo is set to on.

The reason for setting the lens lock servo mechanism, first, is to prevent vibration of the focusing lens 2 when the optical head is moved, the lens lock servo mechanism being kept in the on condition until the focus servo mechanism goes into the on condition.

In the present invention, the focus servo is placed in the on condition when moving to innermost circumference is because of the need for the optical disk apparatus to read the information existing in the area at the innermost part of the recording medium 1.

Then, at step S4 and step S5, access operations to access the target track are repeated from the on condition of the focus servo mechanism, thereby performing recording and reproducing of information.

The resilient part external force compensation value with respect to the focusing lens 2 in the present invention is derived, for example, by taking the average value of the lens actuator means drive command value 24 when the lens lock servo mechanism is in on condition, that is, in the process steps S1 through S3 as shown in FIG. 3.

Next, turning to FIG. 4, an example of the procedure followed by the DSP 8 in the present invention in performing the lens lock servo calculation and in taking the average of the lens actuator means command value 24 will be described, with reference being made to FIG. 4.

The processing for the above-noted lens lock servo calculation and averaging of the lens actuator means command value 24 are performed by the DSP 8 every prescribed period of time, this period being several tens of microsecond, such as for example, 20 μs.

Figure 4:
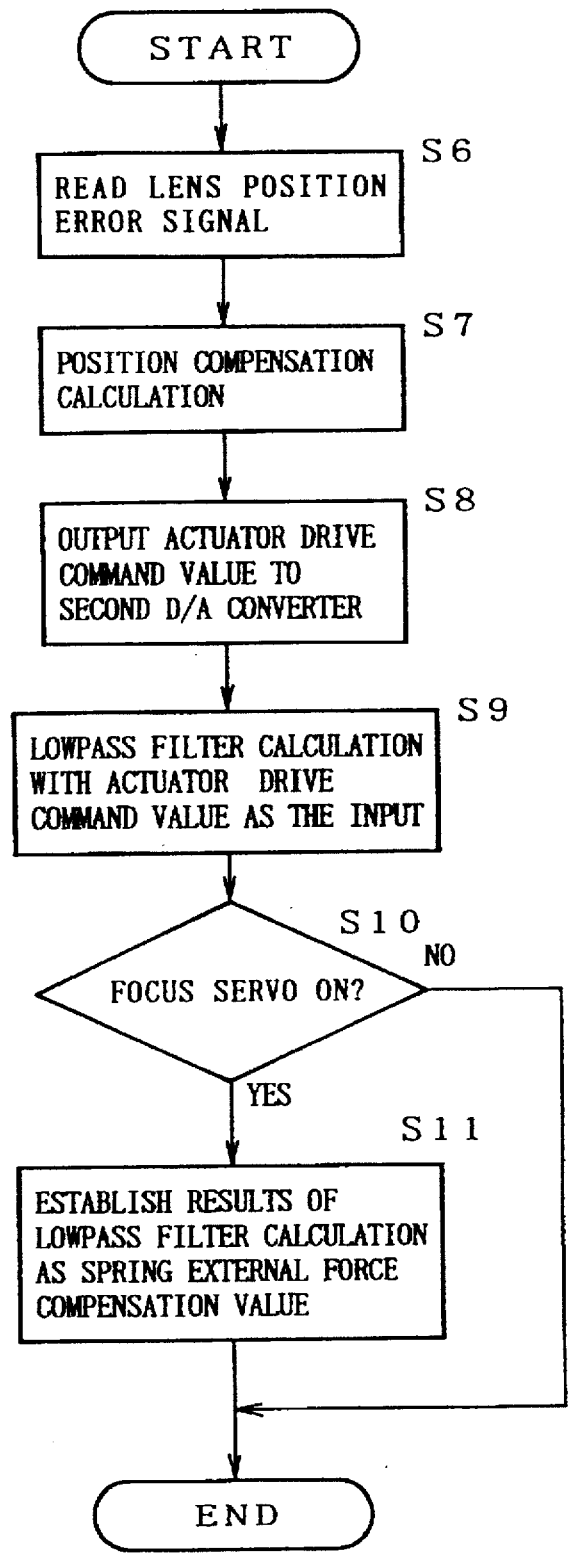
FIG. 4 is a flowchart which shows an example of the procedure of the lens-lock servo when executing the track access method according to the present invention.

At step S1 in FIG. 3, at the point at which the lens lock servo mechanism is turned on, the DSP 8 executes the prescribed processing indicated in the flowchart of FIG. 4 as a subroutine.

That is, at step S6 the lens position error signal 22 is read in by the A/D conversion means 6, and at step 7 a phase compensation calculation is executed.

Next, processing proceeds to step S8, at which the lens actuator means command value 24, which is a result of the phase compensation, is output to the D/A conversion means 10, lens locking servo operation being executed by means of this lens actuator means command value 24.

Finally, processing proceeds to step S9, at which a low-pass filter calculation is performed, with the above-noted lens actuator means command value 24 as the input.

This low-pass filter has a cutoff frequency of approximately several tens of hertz, thereby acting to remove from the lens actuator means command value 24 only DC and near DC components having very low frequencies, the output of this low-pass filter being treatable as a compensation value corresponding to the average value of the lens actuator means command value 24.

In general, a time of one second or greater is required from switching the on condition of the lens lock servo mechanism, until the focus servo mechanism reaches the on condition, enabling the output of the above-noted low-pass filter to be treated as the average value of the lens actuator means command value 24.

That is, the calculation of the above-noted low-pass filter is executed until the focus servo mechanism reaches the on condition, and at step S10 a test is made as to whether or not the focus servo mechanism is in on condition, processing proceeding to step S11 if the result is "yes," the low-pass filter output at that point being taken as the resilient part external force compensation value.

Thereafter, when executing coarse access and precision access, the above-noted resilient part external force compensation value is output from the averaging means 32 and added at the adding means 39 to the lens actuator means command value 24, the resulting sum being output, the lens actuator means 3 being driven based on this compensation value resulting from the above-noted addition.

In a track access method according to the present invention in a track access apparatus having the configuration shown in FIG. 1, in the case of moving the focusing lens 2 to a target track, control is performed of the above-noted lens actuator means 3 so that the speed of the focusing lens 2 in the recording medium radial direction is in accordance with a pre-set reference speed corresponding to the distance to the target track, while performing position control of the optical head drive motor 4 of the optical head 13 simultaneously with the above-mentioned control, so that the position error of the focusing lens 2 is zero, position control of the focusing lens 2 is performed so as to minimize the focusing lens position error with respect to the optical head 13 in the recording medium radial direction beforehand by driving the lens actuator means 3, compensation data obtained from the drive current value 21 of the lens actuator means 3 at that time as a resilient part external force compensation value being stored in the storage means 30, and the above-noted resilient part external force compensation value being added to the drive command value of the lens actuator means 3 when moving the focusing lens 2 in accordance with the above-noted reference speed.

By virtue of the above-described technical constitution, in track access method or a track access apparatus according to the present invention even if there is deformation of the resilient part having, for example a leaf spring, which holds the focusing lens movably to the optical head, or if there is vibration generated in the drive system during drive, or if there is a large inclination of the optical recording/reproducing apparatus occurring at the time of its installation, the external disturbance presented to control by the external force of the resilient part which holds the focusing lens can be canceled out using a simple circuit configuration, enabling stable operation with good access performance, and further enabling a shortening of the access time.

What is claimed is:

1. A track access method for a track access apparatus configured by an optical head, optical head drive motor means which drives said optical head, a focusing lens which is held via a resilient part to the main part of said optical head, lens actuator means which causes said focusing lens to be driven in the radial direction with respect to the direction of rotation of a recording medium, lens position error detecting means which optically detects the position error of the focusing lens with respect to the optical head in the recording medium radial direction, and control means which controls each of said means, whereby, in the case of moving said focusing lens to a target track, position control of said optical head drive motor means is performed in order to make the position error of said focusing lens zero while control of said lens actuator means is performed so that the speed of said focusing lens in the radial direction of said recording medium is in accordance with a pre-set reference speed corresponding the distance to said target track, position control of said focusing lens so as to minimize the focusing lens position error with respect to the optical head in the recording medium radial direction being executed beforehand by driving the lens actuator means, compensation data obtained from the drive current value of said lens actuator means being stored as said resilient part external force compensation value, said compensation data being obtained and stored before moving said focusing lens, and said compensation value being added to the drive command value of said lens actuator means when moving said focusing lens in accordance with said reference speed.

2. A track access method according to claim 1, wherein said resilient part external force compensation value is an averaged values of the drive current value of said lens actuator means for a plurality of different sampled times.

3. A track access method for a track access apparatus configured by an optical head, optical head drive motor means which drives the optical head, a focusing lens which is held via a resilient part to the main part of the optical head, lens actuator means which causes said focusing lens to be driven in the radial direction with respect to the direction of rotation of the recording medium, lens position error detecting means which optically detects the position error of the focusing lens with respect to the optical head in the recording medium radial direction, and control means which controls each of said means, whereby, in the case of moving said focusing lens is to be jump-moved to an immediately adjacent target track, when the movement of said focusing lens in the radial direction of said recording medium is being controlled by said lens actuator means in accordance with pre-established values of acceleration and deceleration, position control of said focusing lens so as to minimize said focusing lens position error with respect to said optical head in the radial direction of the recording medium is performed, beforehand, by driving said lens actuator means, compensation data obtained from a drive current of said lens actuator means being stored as the external force compensation value for said resilient part, said compensation data being obtained and stored before moving said focusing lens, said stored resilient part external force compensation value being added to the drive command value of said lens actuator means.

4. A track access method according to claim 3, wherein said resilient part external force compensation value is an averaged values of the drive current value of said lens actuator means for a plurality of different sampled times.

5. A track access apparatus comprising:

an optical head;

an optical head drive motor means which drives said optical head;

a focusing lens which is held via a resilient part to the main part of said optical head;

lens actuator means for causing said focusing lens to be driven in the radial direction with respect to the direction of rotation of the recording medium;

lens position error detecting means for optically detecting the position error of said focusing lens with respect to the optical head in the recording medium radial direction;

storage means for storing data;

adding means for performing adding, and;

control means which controls each of said means;

wherein minimally when said focusing lens is moved to a target track, said control means performs position control of said optical head drive motor so as to make the position error of said focusing lens zero while performing control of said lens actuator means so that the speed of said focusing lens in the radial direction of said recording medium is in accordance with a pre-set reference speed which corresponds to the distance to said target track, and further wherein when position control is performed of said focusing lens so as to minimize said focusing lens position error with respect to said optical head in the radial direction recording medium beforehand, by driving the lens actuator means, stores compensation data obtained from the drive current value of said lens actuator means as the resilient part external force compensation value, said compensation data being obtained and stored before moving said focusing lens, adding means adding said stored resilient part external force compensation value to said lens actuator means drive command value when moving the focusing lens in accordance with said reference speed.

6. A track access method according to claim 5, wherein said resilient part external force compensation value is an averaged values of the drive current value of said lens actuator means for a plurality of different sampled times.

7. A track access apparatus comprising:

an optical head;

an optical head drive motor means which drives said optical head;

a focusing lens which is held via a resilient part to the main part of said optical head;

lens actuator means for causing said focusing lens to be driven in the radial direction with respect to the direction of rotation of the recording medium;

lens position error detecting means for optically detecting the position error of said focusing lens with respect to the optical head in the recording medium radial direction;

storage means for storing data;

adding means for performing adding, and control means which controls each of said means;

wherein minimally when said focusing lens is jump-moved to an immediately adjacent target track, said storage means stores, as external force compensation data for said resilient part, compensation data obtained from the drive current value of said lens actuator means when position control is performed for the purpose of reducing the lens position error of the focusing lens with respect to the optical head in the radial direction of said recording medium, said compensation data being obtained and stored before moving said focusing lens, and further wherein said adding means adds said stored external force compensation data to the drive command value of said lens actuator means when moving said focusing lens.

8. A track access method according to claim 7, wherein said resilient part external force compensation value is an averaged values of the drive current value of said lens actuator means for a plurality of different sampled times.

* * * * *